(12) United States Patent
Wang et al.

(10) Patent No.: US 11,728,766 B2
(45) Date of Patent: Aug. 15, 2023

(54) SYSTEM AND METHOD FOR COOLING PHOTOVOLTAIC PANEL WITH ATMOSPHERIC WATER

(71) Applicant: KING ABDULLAH UNIVERSITY OF SCIENCE AND TECHNOLOGY, Thuwal (SA)

(72) Inventors: Peng Wang, Thuwal (SA); Renyuan Li, Thuwal (SA); Yifeng Shi, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 17/287,300

(22) PCT Filed: Sep. 17, 2019

(86) PCT No.: PCT/IB2019/057828
§ 371 (c)(1),
(2) Date: Apr. 21, 2021

(87) PCT Pub. No.: WO2020/099950
PCT Pub. Date: May 22, 2020

(65) Prior Publication Data
US 2021/0359644 A1 Nov. 18, 2021

Related U.S. Application Data

(60) Provisional application No. 62/767,646, filed on Nov. 15, 2018.

(51) Int. Cl.
*H02S 40/42* (2014.01)

(52) U.S. Cl.
CPC .................... *H02S 40/425* (2014.12)

(58) Field of Classification Search
CPC ......... H02S 40/42; H02S 40/425; H02S 40/44
See application file for complete search history.

(56) References Cited

U.S. PATENT DOCUMENTS

2013/0036909 A1\* 2/2013 Menard ............... H01L 31/0543
95/91
2017/0263789 A1\* 9/2017 Simpson ................. H02S 40/42

FOREIGN PATENT DOCUMENTS

| CN | 207117569 U | \* | 3/2018 |
| CN | 207117569 U | | 3/2018 |
| JP | S62101086 A | | 5/1987 |

OTHER PUBLICATIONS

English machine translation of Shen (CN-207117569-U) provided by the EPO website, 2022, All Pages. (Year: 2022).\*

(Continued)

*Primary Examiner* — Daniel P Malley, Jr.
(74) *Attorney, Agent, or Firm* — Patent Portfolio Builders PLLC

(57) ABSTRACT

An integrated photovoltaic (PV) panel-water sorption layer system that includes a PV panel having a front face that is configured to receive solar light for generating electrical current, and a back face that is opposite to the front face; and an atmospheric water harvesting device attached to the back face of the PV panel. The atmospheric water harvesting device is configured to cool down the PV panel by evaporating absorbed atmospheric water based on heat received from the PV panel.

17 Claims, 12 Drawing Sheets

(56) References Cited

OTHER PUBLICATIONS

English machine translation of Shen (CN-207117569-U) provided by the EPO website, All Pages, 2018. (Year: 2018).*
International Search Report in corresponding/related International Application No. PCT/IB2019/057828, dated Nov. 7, 2019.
Written Opinion of the International Searching Authority in corresponding/related International Application No. PCT/IB2019/057828, dated Nov. 7, 2019.

* cited by examiner

| Hydrous state formula | Anhydrous state formula |
|---|---|
| $FeSO_4 \cdot 7H_2O$ | $FeSO_4$ |
| $Li_2SO_4 \cdot H_2O$ | $Li_2SO_4$ |
| $Na_2CO_3 \cdot H_2O$ | $Na_2CO_3$ |
| $Na_2SO_4 \cdot 10H_2O$ | $Na_2SO_4$ |
| $CuCl_2 \cdot 2H_2O$ | $CuCl_2$ |
| $(CH_3COO)_2Ni \cdot 4H_2O$ | $(CH_3COO)_2Ni$ |
| $CuSO_4 \cdot 5H_2O$ | $CuSO_4$ |
| $MgSO_4 \cdot 6H_2O$ | $MgSO_4$ |

FIG. 7

| Chemical formula | IUPAC Name |
|---|---|
| LiCl | Lithium chloride |
| CaCl$_2$ | Calcium chloride |
| MgCl$_2$ | Magnesium chloride |
| ZnCl$_2$ | Zink chloride |
| FeCl$_3$ | Iron (III) chloride |
| Zn(NO$_3$)$_2$ | Zink nitrate |
| Cu(NO$_3$)$_2$ | Copper (II) nitrate |
| Ni(NO$_3$)$_2$ | Nickel (II) nitrate |
| Mn(NO$_3$)$_2$ | Manganese (II) nitrate |

FIG. 8

| Polymer | Abbreviation |
|---|---|
| Poly(acrylic acid) | PAA |
| Poly(vinyl pyrrolidone) | PVP |
| Poly(acrylamide) | PAM |
| Poly(ethylene oxide) | PEO |
| Poly(vinyl methyl ether) | PVME |
| Poly(vinyl alcohol) | PVA |
| Hydroxypropylcellulose | HPC |
| Hydroxyethylcellulose | HEC |
| Poly(2-hydroxyethyl vinyl ehter) | PHEVE |
| Poly(N-isopropylacrylamide) | PNIPAM |

FIG. 10

SYSTEM AND METHOD FOR COOLING PHOTOVOLTAIC PANEL WITH ATMOSPHERIC WATER

CROSS-REFERENCE TO RELATED APPLICATIONS

This application is a U.S. National Stage Application of International Application No. PCT/IB2019/057828, which claims priority to U.S. Provisional Patent Application No. 62/767,646, filed on Nov. 15, 2018, entitled "A METHOD FOR PHOTOVOLTAIC (PV) PANEL COOLING ASSISTED BY ATMOSPHERIC WATER HARVESTING MATERIAL," the disclosures of which are incorporated herein by reference in their entirety.

BACKGROUND

Technical Field

Embodiments of the subject matter disclosed herein generally relate to a system and method for cooling a photovoltaic (PV) panel with water harvested from the atmosphere, and more particularly, to a system that absorbs moist air from the air, evaporates the water to cool down the PV panel, and generates fresh water by condensing the water vapor.

Discussion of the Background

A solar panel (also referred to herein as a solar cell or photovoltaic panel (PV panel)) usually absorbs 80% to 95% of the energy from the sunlight that is incident on its surface. From this energy, only about 6% to 25% of the absorbed solar energy is converted to electricity. The rest of the absorbed solar energy is converted to heat, which undesirably increases the temperature of the PV panel. In addition, as many PV panels are placed in regions of high sun activity, these regions also tend to be hot, i.e., to show high temperatures during the day. When the temperature of a PV panel increases due to any kind of heat, its energy efficiency decreases. In addition, the high temperature of the PV panel also degrades its lifetime. Thus, effective cooling of the PV panel is desired for the solar power plants.

There are two types of cooling technics that have been adopted in the industry. A first cooling technique is the active cooling, which mainly uses cold water or wind flow as a coolant for removing the ambient heat. The advantage of this active cooling approach is the high-efficiency of the heat dissipation from the PV panel surface. However, the active cooling approach requires a complicated engineering design and needs extra energy to power up the condenser and the re-flux coolant that are part of the cooling system. In addition, this approach uses fresh water, which might be scarce in the region where the PV panels are installed.

The second cooling approach is the passive cooling. The passive cooling by a large-scale heat sink array has been previously reported in the literature. The advantage of the heat-sink based passive cooling process is that it uses less energy and needs a less complicated structure than the active cooling system. However, a disadvantage of this approach is that it entails large heat sink areas.

Thus, engineering simple, inexpensive, and effective strategies for PV panel cooling is highly sought after.

BRIEF SUMMARY OF THE INVENTION

According to an embodiment, there is an integrated photovoltaic (PV) panel-water sorption layer system that includes a PV panel having a front face that is configured to receive solar light for generating electrical current, and a back face that is opposite to the front face, and an atmospheric water harvesting device attached to the back face of the PV panel. The atmospheric water harvesting device is configured to cool down the PV panel by evaporating absorbed atmospheric water based on heat received from the PV panel.

According to another embodiment, there is an integrated photovoltaic (PV) panel-water sorption layer system that includes a PV panel having a front face that is configured to receive solar light for generating electrical current, and a back face that is opposite to the front face, a water sorption layer formed directly on the back face of the PV panel, a cover lid that together with the back face of the PV panel form a sealed chamber, wherein the water sorption layer is located inside the sealed chamber, and an actuation device connected to the cover lid. The actuation device is configured to move the cover lid to unseal the chamber so that ambient air enters inside the chamber.

According to still another embodiment, there is a method for cooling down a photovoltaic (PV) panel with water harvested from atmosphere. The method includes providing an integrated photovoltaic (PV) panel-water sorption layer system that has a water sorption layer formed directly on a back face of a PV panel, generating electrical energy from solar energy received at a front face of the PV panel, wherein the front face is opposite to the back face, transferring heat generated by the PV panel to the water sorption layer to evaporate water stored by the water sorption layer, which results in cooling down the PV panel, opening a cover lid with an actuation device, wherein the cover lid together with the back face of the PV panel form a sealed chamber in which the water sorption layer is located, and allowing moist air to enter the chamber to replenish the water in the water sorption layer.

BRIEF DESCRIPTION OF THE DRAWINGS

For a more complete understanding of the present invention, reference is now made to the following descriptions taken in conjunction with the accompanying drawings, in which:

FIGS. 7 to 10 show various possible components of the water sorption layer;

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a system that uses a hydraulic activated cover lid for forming a closed chamber in which moist air is trapped and heated. However, the embodiments to be discussed next are not limited to a hydraulic activated cover lid, but may be applied to any types of a moving cover lid.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a water sorption layer is used as a new passive cooling component for PV panel cooling. This water sorbent cooling layer can be directly attached to a back face of the PV panel. In one application, the water sorbent cooling layer is attached to a highly thermally conductive layer and this layer is directly attached to the back face of the PV panel. The water sorbent cooling layer is configured to capture/store water from the ambient air during night or other periods when the PV panel is not operating, and to cool down the PV panel during day time, by evaporating the sorbed water. Note that a water sorbent material is a material that is configured to absorb or adsorb water from the ambient. If the water takes up the volume of this layer, the process is called absorption. However, if the water attaches to the surface of the layer, then the process is called adsorption. The term "sorbent" is used herein to cover absorption, adsorption, and both absorption and adsorption.

One or more advantages of various embodiments of this system include, but is not limited to: (1) it is an all-in-one system integrating water harvesting and PV panel cooling; (2) it has a reliable engineering design; (3) it works in the absence of any open water source; and (4) the harvested atmospheric water can be collected as fresh water for other uses, such as solar panel dust removal and/or top surface cooling.

Figure 1:
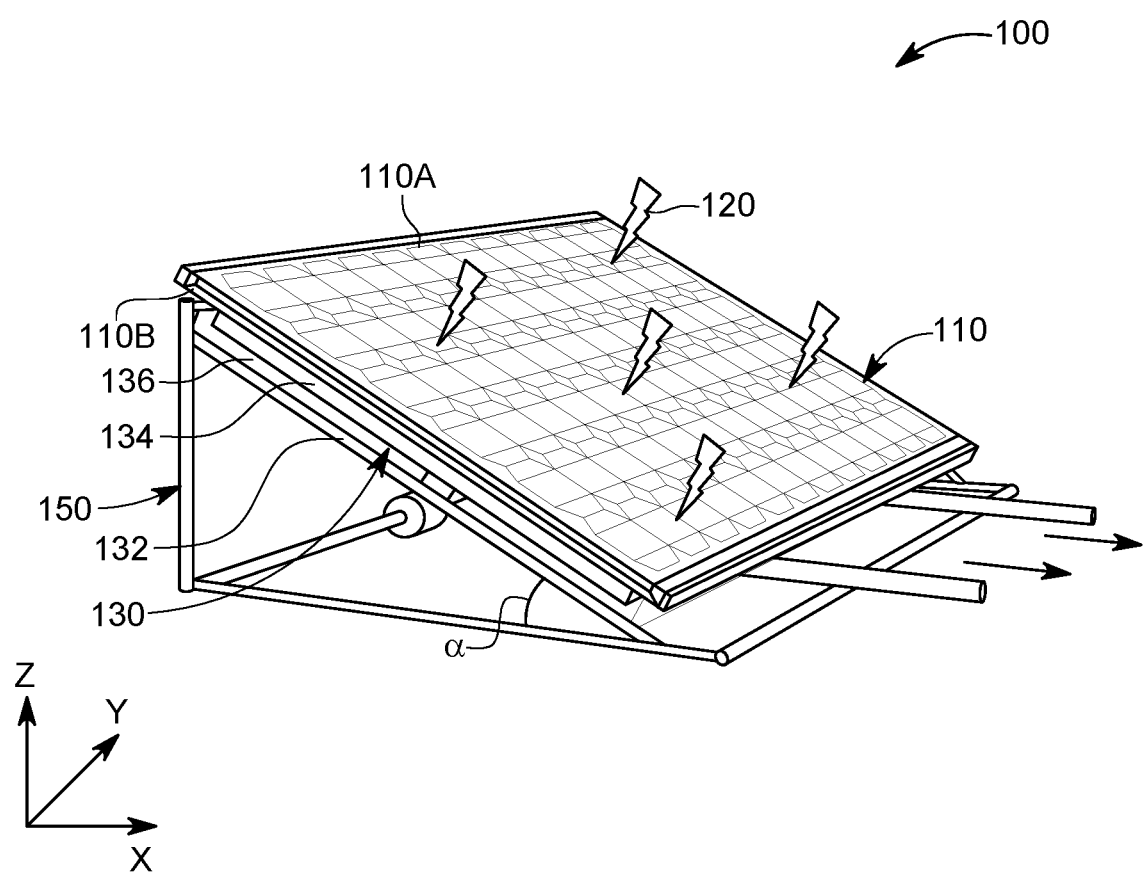
FIG. 1 is a schematic diagram of an integrated PV panel-water sorption layer system that cools a PV panel with water harvested from the ambient.

More details about this water sorption layer and how the layer is integrated with a PV panel are now discussed with regard to the figures. FIG. 1 shows an integrated PV panel-water sorption layer system 100, which is called herein atmospheric water cooled PV panel system. The atmospheric water cooled PV panel system 100 includes a PV panel 110, which has a front face 110A that is configured to receive solar light 120, and an atmospheric water harvesting device 130, which is directly attached to a back face 110B of the PV panel 110. Note that the front face 110A of the PV panel is opposite to the back face 110B. The atmospheric water cooled PV panel system 100 further includes a support mechanism 150, which is configured to support both the PV panel 110 and the water harvesting device 130. The PV panel is supported by the support mechanism 150 with a certain non-zero angle α relative to a horizontal plane defined by the axes X and Y in the figure. The support mechanism 150 may include various piping as discussed later.

Figure 2A:
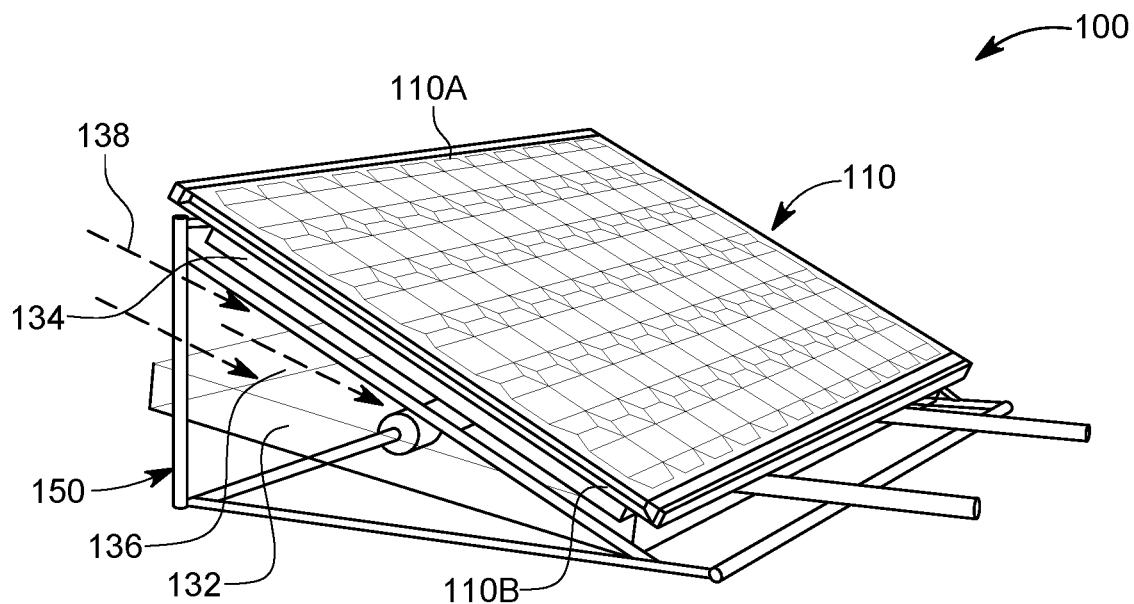
FIG. 2A is a schematic diagram of the integrated PV panel-water sorption layer system showing an open cover lid for allowing the ambient air to enter inside a chamber where a water sorption layer is located and FIG. 2B shows the same but without a cover lid.
Figure 2B:
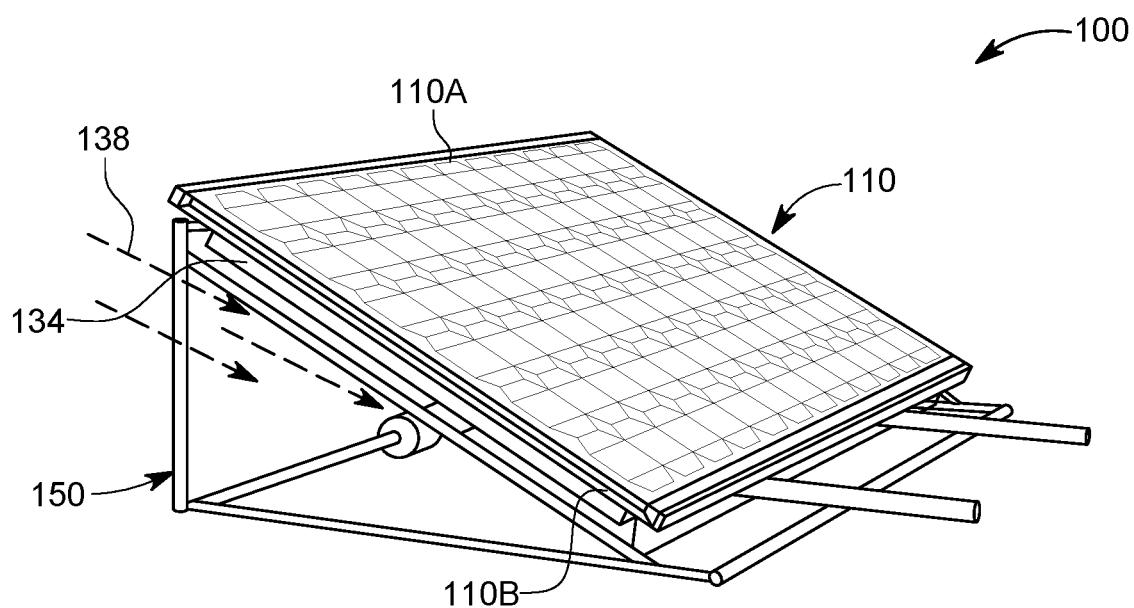

The support mechanism 150 is configured to open and close a cover lid 132 of the water harvesting device 130, to allow moist air to contact a water sorption layer 134, as illustrated in FIG. 2A. In this embodiment, the water sorption layer 134 is shown being directly attached to the back face 110B of the PV panel 110. However, as previously discussed, a highly thermally conductive layer can be sandwiched between the back face of the PV panel and the water sorption layer. The cover lid 132 is configured to encapsulate the water sorption layer 134 when in the closed position, as shown in FIG. 1. The cover lid 132 and the back face 110B of the PV panel 110 form a chamber 136, which is sealed from the ambient when closed. In one application, the cover lid and the back face of the PV panel fully encapsulate the water sorption layer, i.e., these two elements fully define the chamber. However, as shown in FIG. 2A, when the cover lid 132 is in the open position, the chamber 136 is open to the ambient so that the moist air 138 can enter inside the chamber. Note that in one embodiment, it is possible, as shown in FIG. 2B, to have the harvesting device 130 with no cover lid 132, so that moist air can continuously be absorbed by the water sorption layer 134.

Figure 3:
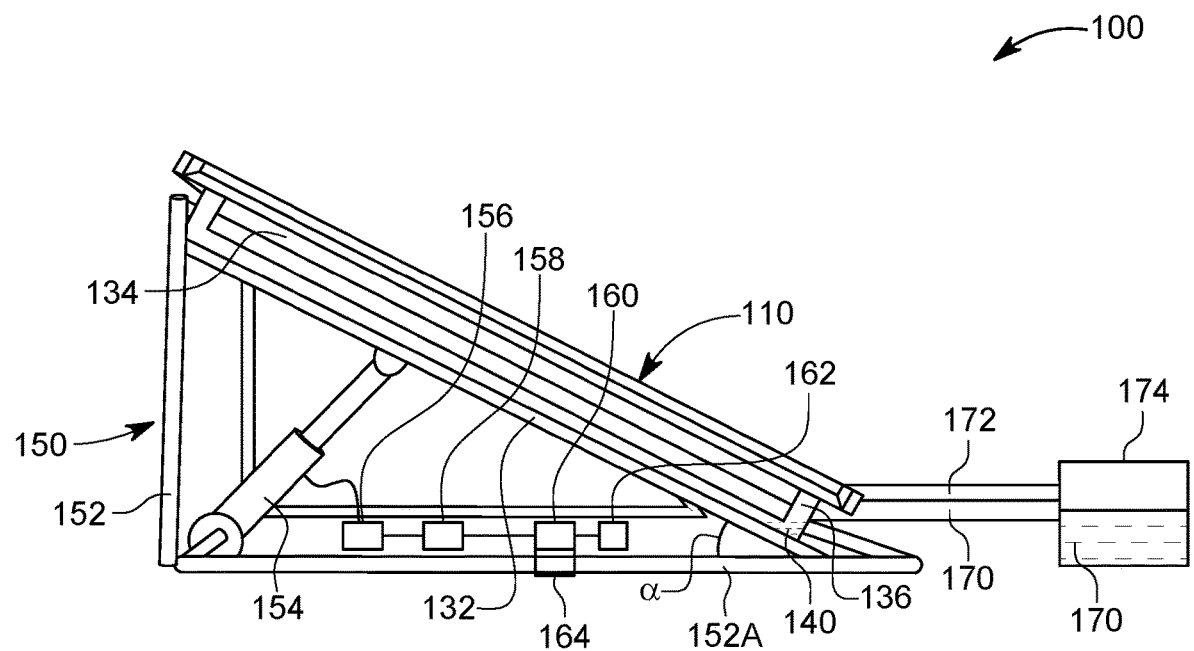
FIG. 3 is a side view of the integrated PV panel-water sorption layer system that shows other components.
Figure 4:
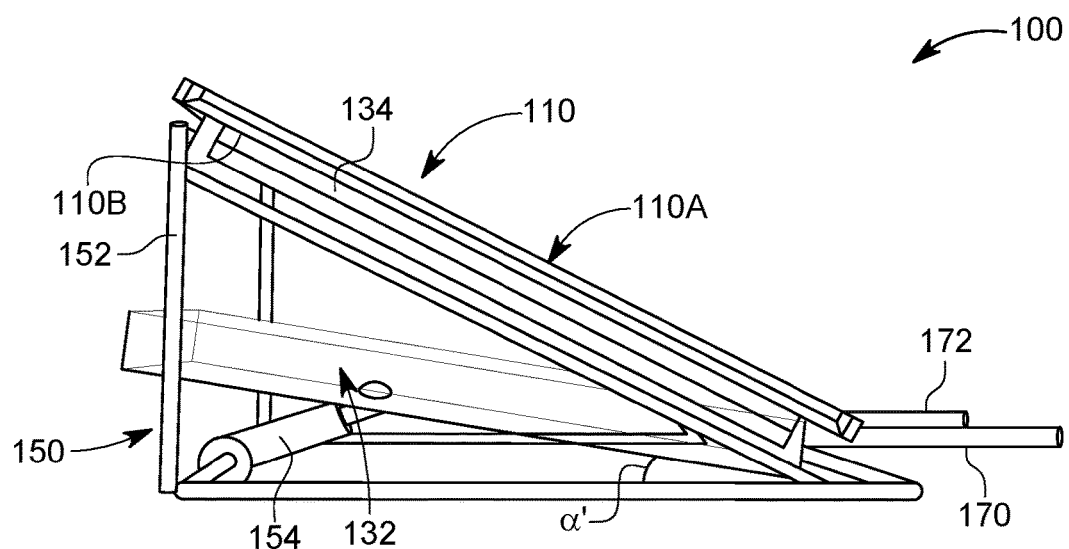
FIG. 4 is also a side view of the integrated PV panel-water sorption layer system that shows an actuation mechanism for moving the cover lid.

FIG. 3 shows a side view of the atmospheric water cooled PV panel system 100. The cover lid 132 is showed in the closed position, forming the chamber 136 with the back face 110B of the PV panel 110. FIG. 3 also shows that while a frame 152 (for example, metallic frame) holds the PV panel 110 at the angle α relative to a horizontal part (base 152A) of the frame 150, an actuation device 154, which is also part of the support mechanism 150, is attached between the base 152A and the back face 110B of the panel 110, and is configured to move the cover lid 132 between the closed position shown in FIG. 3 and the open position shown in FIG. 4. The actuation device 156 may be a hydraulic device as shown in FIGS. 3 and 4 having a hydraulic arm. One skilled in the art would understand that the actuation device 156 may also be implemented as a non-hydraulic device, for example, as an electric motor and a corresponding arm.

FIG. 3 also shows a pump 156 that is configured to pump air or another fluid, for example, from a storage container 158, into the hydraulic arm to open and close the cover lid 132. In one embodiment, a controller 160 automatically determines when to close and open the cover lid 132 and instructs accordingly the hydraulic arm to move the cover lid. The controller 160, which may be implemented as a computing device or processor, may be connected to a power source 162, for example, a battery. In one embodiment, the battery may be charged by electricity generated by the PV panel 110.

In still another embodiment, the controller 160 may include a light sensor or an internal clock 164, which may be used for determining when to close or open the cover lid. For example, if a light sensor 164 is provided with the controller 160, then the controller may be programmed to keep the cover lid 132 closed during the day time, so that water evaporates inside the chamber 136 and cools the PV panel 110, and to keep the cover lid open during the night time, so that the moist ambient air 138 enters the chamber to replenish the water in the water sorption layer. In another implementation, if the internal clock is used instead of the light sensor, the controller may be programmed to open the cover lid during the night time and close the cover lid during the day time based on the time provided by the internal clock. Those skilled in the art would recognize that the controller may be programmed based on other criteria for opening and closing the cover lid, for example, based on weather considerations, humidity inside the chamber, etc.

In the embodiment illustrated in FIG. 3, one or more pipes 170 and 172 may be connected to the bottom of the chamber 136, so that the condensed water 140, formed inside the chamber 136, can be collected at a container 174, that is attached to the one or more pipes 170 and 172. The condensed water 140 is fresh water in this case and it is obtained by condensing on the cover lid the water vapor formed as a consequence of evaporating the atmospheric water sorbed by the water sorption layer 134, due to the heat generated by the back face of the PV panel.

Note that the cover lid 132 moves due to the actuation device 154 from the closed position, which is described by the first angle $\alpha$, to the open position, which is described by a second angle $\alpha'$. In one embodiment, both angles $\alpha$ and $\alpha'$ are non-zero angles and they are different from each other.

Figure 5:
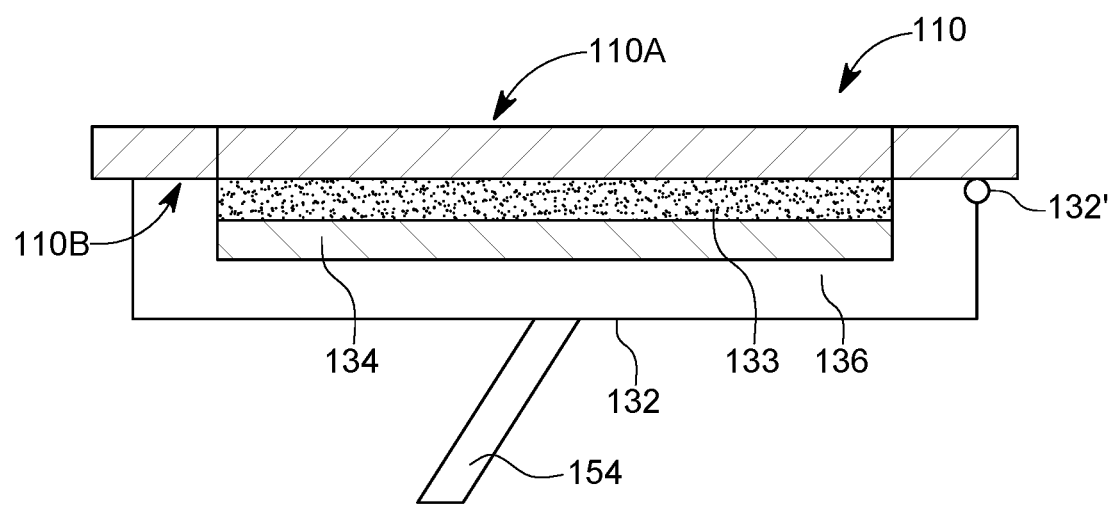
FIG. 5 schematically illustrates the location of various layers that form the integrated PV panel-water sorption layer system.

The water sorption layer 134 can be directly attached to the back face 110B of the PV panel 110 as shown in FIGS. 1-4. However, in one embodiment, as illustrated in FIG. 5, a heat conducting layer 133 may be placed between the back face 110B of the PV panel 110 and the water sorption layer 134 so that the heat conducting layer 133 is directly sandwiched between the back face of the PV panel and the water sorption layer. These layers can be attached to each other by known methods, for example, direct bonding with a resin or glue, or can be mechanically attached to each other with clamps, screws, or other similar means. FIG. 5 also shows the chamber 136 formed between the back face 110B of the PV panel 110 and the cover lid 132. A hinge 132' or similar mechanism may be formed between the PV panel 110 and the cover lid 132 to allow the cover lid to open and close when actuated by the actuation mechanism 154. In one embodiment, the hinge 132' may be part of the support device 150.

Figure 6:
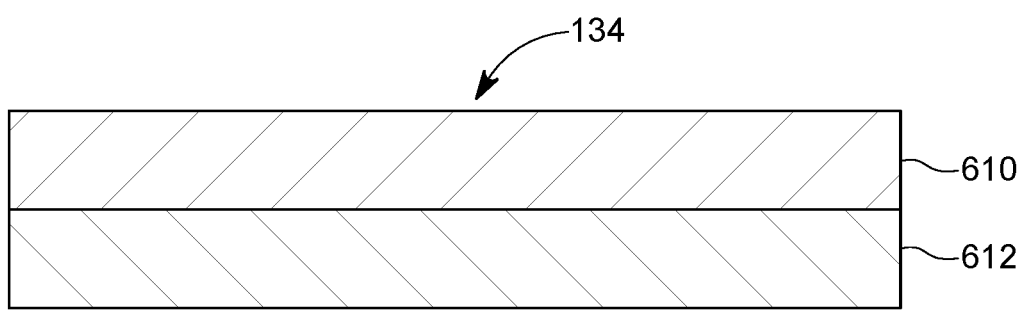
FIG. 6 schematically illustrates the water sorption layer of the integrated PV panel-water sorption layer system.

The water sorption layer 134 may be implemented, in one embodiment, as a combination of two components: (1) a water vapor sorbent sublayer 610, and (2) a substrate/matrix sublayer 612, as illustrated in FIG. 6. The water vapor sorbent sublayer 610 may include one or more of the following materials: (a) conventional solid-state porous materials; (b) anhydrate/hydrate salt couples; (c) deliquescent salts, (d) hygroscopic polymers, and (e) ionic liquids.

Figure 9A:
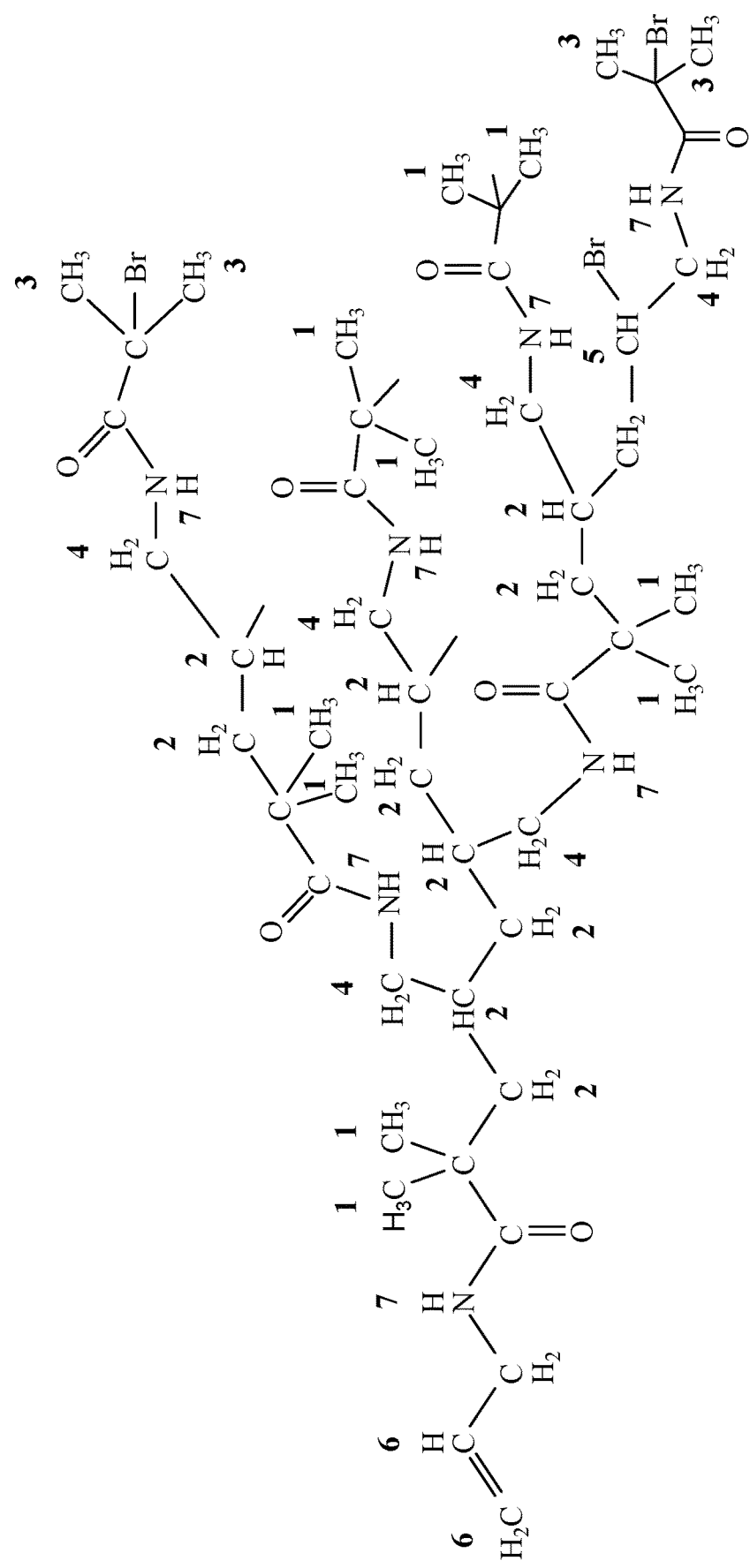
Figure 9B:
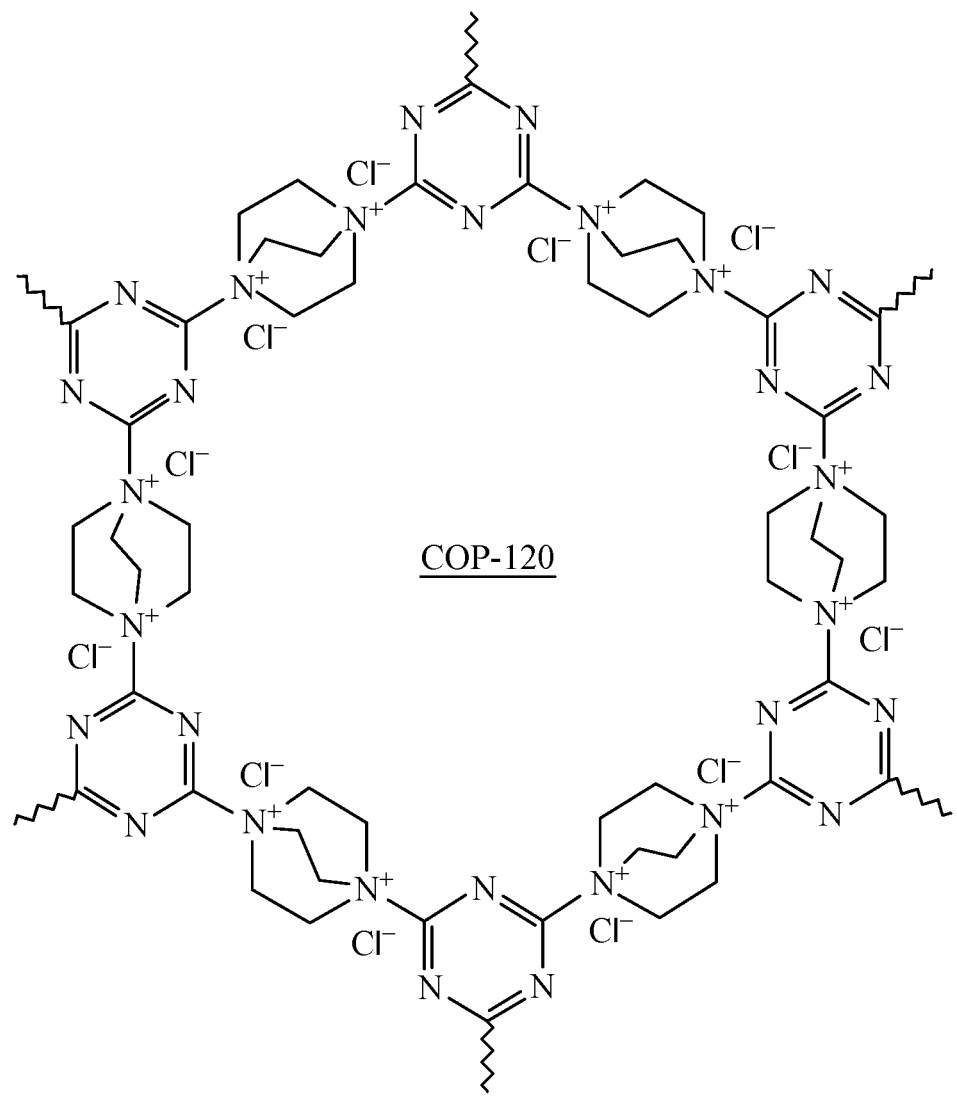

The conventional solid-state porous materials (a) may include, but are not limited to: activated carbon, metal-organic-framework (MOF), zeolite, silica gel, mesoporous silica/carbon, clay, etc. The anhydrate/hydrate salt couples (b) are inexpensive and commercially available. They can absorb water vapor in air through a hydration reaction. FIG. 7 shows a group of examples of hydrous/anhydrous couples that can be used for the water vapor sorbent sublayer 610. The deliquescent salt (c) can dissolve itself into water when exposed to a humid ambient air and is capable of capturing large amount of water. FIG. 8 shows several examples of such deliquescent salts that can be used for the water vapor sorbent sublayer 610. The hygroscopic polymers (d) may be obtained by tuning their chemical composition and structures. The hygroscopic polymers can be used as water vapor sorbent under certain circumstances. FIGS. 9A and 9B shows two example of hydroscopic polymer structures. The ionic liquids (e) have been investigated as liquid desiccants in several fields. The advantage of the ionic liquids is their low corrosion to metals. The above mentioned water vapor sorbents can be mixed in any combination for tuning the water sorption layer's performance, depending on application scenario (humidity of the ambient air, temperature of the ambient air, etc.).

The substrates/matrix sublayer 612 is needed when the water vapor sorption sublayer 610 includes materials that are powdery substances or a liquid. In one embodiment, the matrix sublayer 612 may include (a) polymeric hydrogels, and/or (b) metallic/organic/inorganic-nonmetallic sponges/foams to hold the powdery or liquid water vapor sorbents. The polymeric hydrogels (a) are configured to hold large quantities of water by volume expansion, and also they are capable of maintaining their solid-state structure. FIG. 10 shows a group of polymeric hydrogels that can be used in this embodiment. Furthermore, the hydrogel material can be made from a mixture of the polymers shown in FIG. 10.

The metallic/organic/inorganic-nonmetallic sponges/foams (b) have a porous structure that can hold large amounts of powdery water vapor sorbents and provides large amount of sorption sites. They also have outstanding heat transfer capabilities due to the conductivity of ceramics, metal and carbon fiber that may present. The metallic/organic/inorganic-nonmetallic sponges/foams are inexpensive materials, and one example of such material is the glass fibers.

Figure 11:
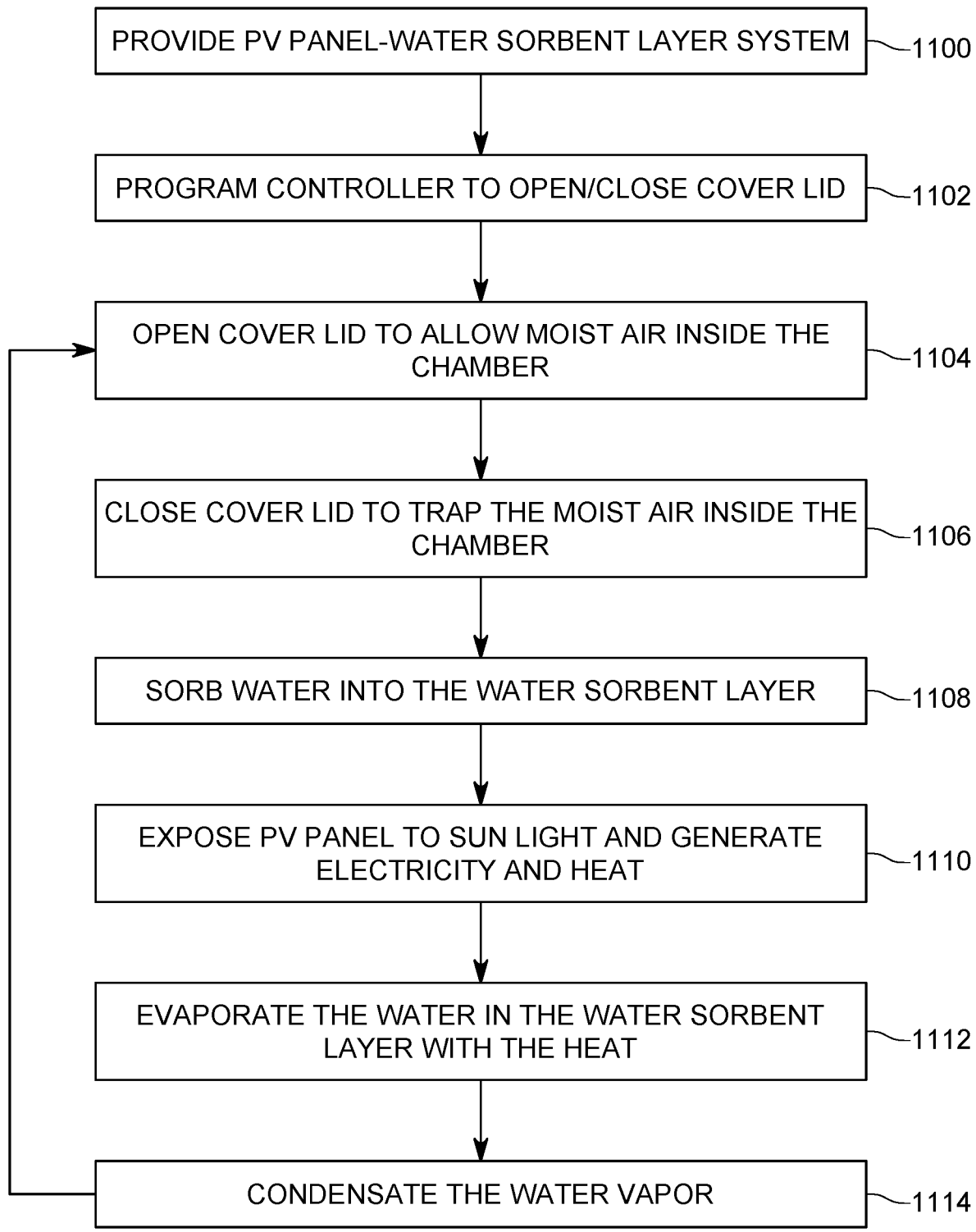
FIG. 11 is a flowchart of a method for cooling down the PV panel, of the integrated PV panel-water sorption layer system, with water harvested from the ambient air.

A method for cooling a PV panel with water harvested from the atmosphere is now discussed with regard to FIG. 11. The integrated PV panel-water sorption layer system 100 can include as the water vapor sorption sublayer any material or combination of materials discussed above. In addition, the integrated PV panel-water sorption layer system 100 can include as the substrate/matrix sublayer 612 any material or combination of materials discussed above. The method starts in step 1100 by providing the integrated PV panel-water sorption layer system 100 at a location where there is a sunlight during the day. In step 1102, a controller 160 of the system 100 is programmed to open and close the cover lid 132 when a given condition is taking place. In one embodiment, the condition is related to a time of the day, i.e., close the cover lid during the day time and open the cover lid during the night time. Other conditions may be used. In step 1104, the cover lid is opened and moist air 138 enters inside the chamber 136, which is defined by the cover lid 132. In step 1106, the cover lid is closed so that the moist air 138 is trapped inside the chamber 136. Note that steps 1104 and 1106 may be automatically implemented by the controller 160.

Because the water sorption layer 134 is enclosed by the cover lid 132, water from the moist air 138 is sorbed in step 1108 by this layer. In step 1110, the panel PV 110 is exposed to the sun light and generates electricity. At the same time, the panel PV generates heat, which is transferred through its back face 110B to the water sorption layer 134. In step 1112, the heat transferred from the PV panel 110 is used by the water sorption layer 134 to evaporate the water sorbed from the moist air, and thus, to reduce a temperature of the PV panel. During this process, the heat from the PV panel is effectively used as latent heat to evaporate the water in the water sorption layer and create the water vapor. In step 1114, the water vapor contacts the walls of the cover lid and condensate, forming fresh water 140, which may be collected outside the system 100, as shown in FIG. 3. The process then returns to step 1104, so that more moist air is allowed into the chamber and the following steps are repeated. The controller 160 controls how many times a day the cover lid opens and closes. In one application, the cover lid is opened only during the night and closed during the entire day. If the controller is connected either to sensors that can anticipate the weather or to a weather service provider, the controller can also activate the actuation device 154 to open the cover lid during the day, for example, if there are rainy conditions or there is no sun.

While the figures show only one integrated PV panel-water sorption layer system 100, those skilled in the art would understand that all the PV panels of a power production plant may be modified to have the features shown in the figures. In other words, any PV panel may be retrofitted with the atmospheric water harvesting device 130 for cooling the PV panel with water harvested from atmosphere.

Figure 12A:
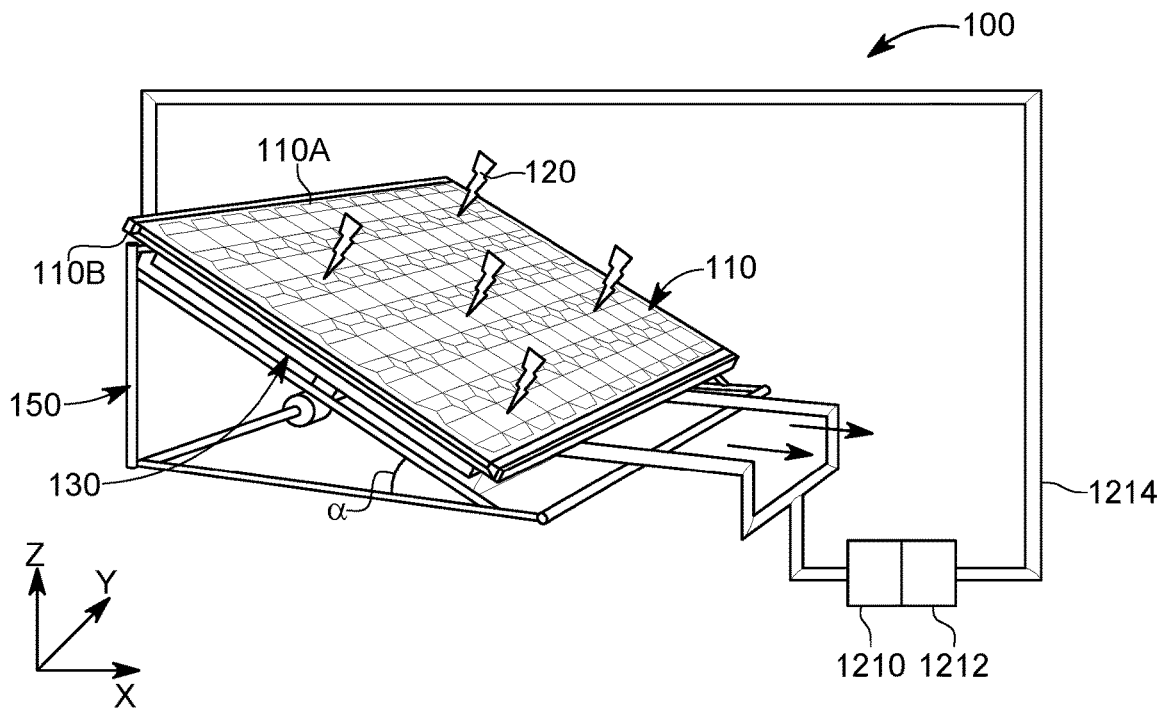
FIGS. 12A and 12B illustrate a variation of the integrated PV panel-water sorption layer system, in which the fresh water generated in the chamber is reused.
Figure 12B:
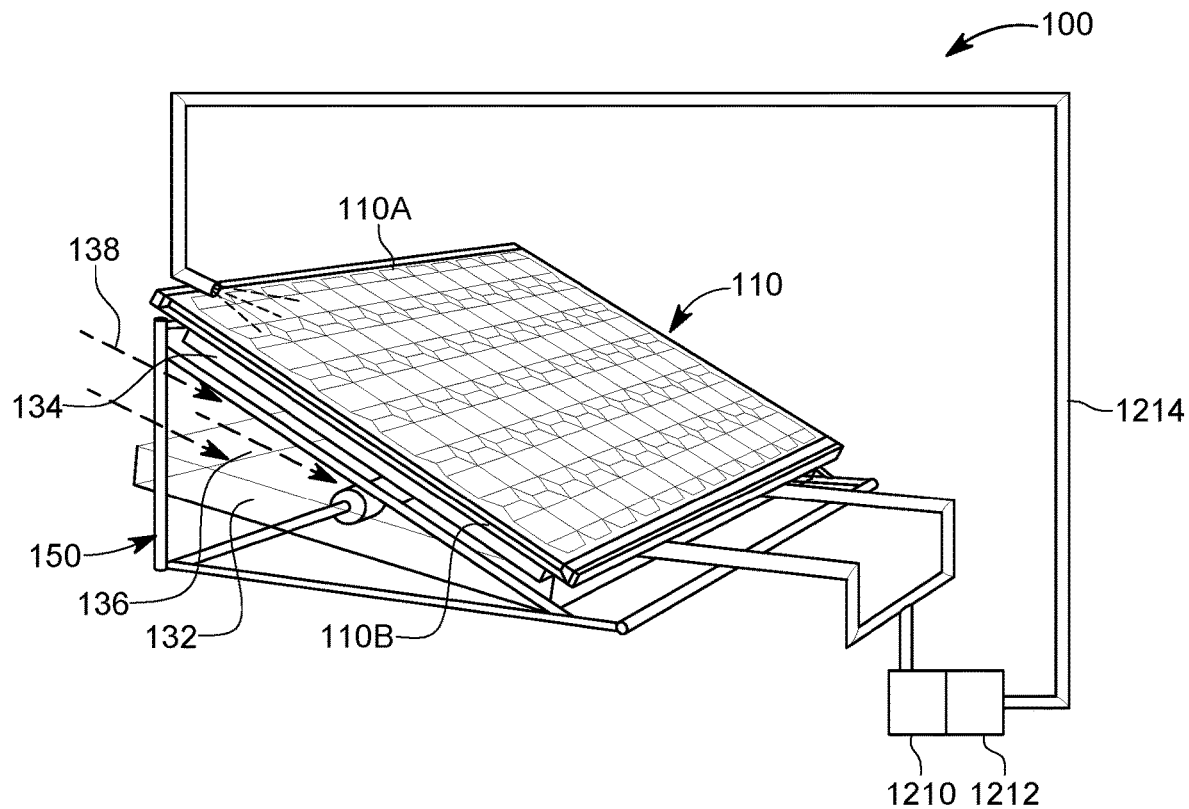

In one embodiment, as illustrated in FIGS. 12A and 12B, the fresh water 140 generated inside the chamber 136 is collected outside the system 100, into a water container 1210, and then, pumped with a pump 1212 along a conduit 1214 back to the chamber 136 (see FIG. 12A). If this configuration is implemented, then the conduit 1214 is configured to deliver the water directly to the water sorption layer 134. In this case, the conduit 1214 may be provided, for example, with a shower head to spray the water directly onto the water sorption layer 134. The pump 1212 may be controlled by controller 160 and may be supplied with electricity directly from the PV panel 110 or the power source 162 (see FIG. 3). Even if the fresh water 140 is recirculated, the controller still opens and closes the cover lid 132, as illustrated in FIG. 12B. In a variation of this embodiment, the conduit 1214 may be configured to spray the fresh water 140 directly onto the front surface 110A of the PV panel 110, for cleaning it.

Figure 13:
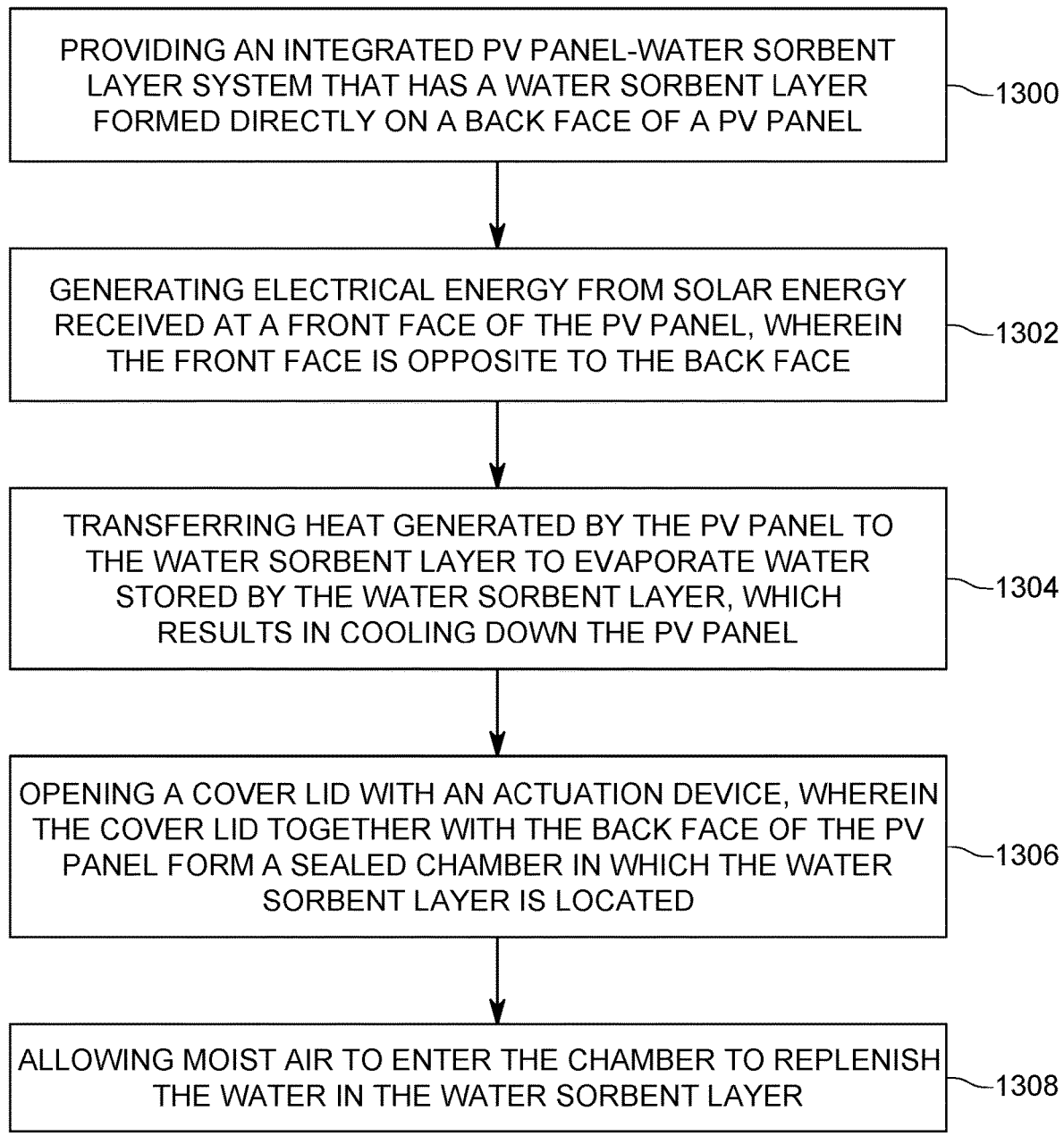
FIG. 13 is a flowchart of another method for cooling down the PV panel of the integrated PV panel-water sorption layer system with water harvested from the ambient air.

A method for cooling down a PV panel with water harvested from atmosphere is now discussed with regard to FIG. 13. The method includes a step 1300 of providing an integrated PV panel-water sorption layer system that has a water sorption layer formed directly on a back face of a PV panel, a step 1302 of generating electrical energy from solar energy received at a front face of the PV panel, wherein the front face is opposite to the back face, a step 1304 of transferring heat generated by the PV panel to the water sorption layer to evaporate water stored by the water sorption layer, which results in cooling down the PV panel, a step 1306 of opening a cover lid with an actuation device, wherein the cover lid together with the back face of the PV panel form a sealed chamber in which the water sorption layer is located, and a step 1308 of allowing moist air to enter the chamber to replenish the water in the water sorption layer.

The method may further include a step of closing the cover lid to seal the chamber and to restart the water evaporation process, and/or actuating an actuation device to close and open the cover lid. The evaporated water may be collected as previously discussed for cleaning the surface of the PV panel, or it can recirculated back to the water sorption layer. However, if the condensed water is not desired to be collected, it can be simply discharged outside the chamber, for example, through one or more pipes as shown in the figures.

The disclosed embodiments provide an integrated PV panel-water sorption layer system that cools down the PV panel with water harvested from the atmosphere. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An integrated photovoltaic (PV) panel-water sorption layer system comprising:
    a PV panel having a front face that is configured to receive solar light for generating electrical current, and a back face that is opposite to the front face;
    an atmospheric water harvesting device attached to the back face of the PV panel, the atmospheric water harvesting device including:
        a water sorption layer formed directly on the back face of the PV panel, and
        a cover lid that together with the back face of the PV panel form a sealed chamber; and
    an actuation device connected to the cover lid and configured to move the cover lid to unseal the sealed chamber so that ambient air enters inside the sealed chamber,
    wherein the water sorption layer is placed in the sealed chamber, and
    wherein the atmospheric water harvesting device is configured to cool down the PV panel by evaporating absorbed atmospheric water based on heat received from the PV panel.

2. The system of claim 1, wherein the actuation device includes a hydraulic arm that moves the cover lid between an open position and a closed position.

3. The system of claim 2, wherein the chamber is unsealed in the open position and the chamber is sealed in the closed position.

4. The system of claim 1, wherein the ambient air enters the chamber in the open position, but not in the closed position.

5. The system of claim 1, wherein the water sorption layer includes a hydrogel configured to absorb or adsorb water.

6. The system of claim 1, wherein the water sorption layer includes a water vapor sorption sublayer and a substrate sublayer that is configured to support the water vapor sorption sublayer.

7. The system of claim 6, wherein the water vapor sorption sublayer includes at least one of a solid-state porous material, anhydrate or hydrate salt couple, deliquescent salt, hygroscopic polymer and ionic liquid.

8. The system of claim 1, further comprising:
    the actuation device is a hydraulic device connected to the cover lid;
    a controller that controls the hydraulic device to move the cover lid to unseal the sealed chamber so that ambient air enters inside the sealed chamber; and a support device configured to hold the PV panel at a non-zero angle with the ground, and also to provide support to the hydraulic device and the controller.

9. The system of claim 8, further comprising:
one or more pipes connected to the chamber and configured to direct the fresh water from the chamber to outside of the system.

10. The system of claim 9, further comprising:
a conduit configured to direct the fresh water from the outside the system either back to the chamber, onto the water sorption layer, or onto the front face of the PV panel.

11. An integrated photovoltaic (PV) panel-water sorption layer system comprising:
a PV panel having a front face that is configured to receive solar light for generating electrical current, and a back face that is opposite to the front face;
a water sorption layer formed directly on the back face of the PV panel;
a cover lid that together with the back face of the PV panel form a sealed chamber, wherein the water sorption layer is located inside the sealed chamber;
a frame configured to hold the PV panel to make a non-zero angle with a horizontal; and
an actuation device connected to the cover lid,
wherein the actuation device is configured to move the cover lid to unseal the chamber so that ambient air enters inside the chamber.

12. The system of claim 11, wherein the water sorption layer includes a hydrogel configured to absorb or adsorb water from the ambient air.

13. The system of claim 11, wherein the water sorption layer includes a water vapor sorption sublayer and a substrate sublayer that is configured to support the water vapor sorption sublayer.

14. The system of claim 11, wherein the water vapor sorption sublayer includes at least one of a solid-state porous material, anhydrate or hydrate salt couple, deliquescent salt, hygroscopic polymer and ionic liquid.

15. A method for cooling down a photovoltaic (PV) panel with water harvested from atmosphere, the method comprising:
providing an integrated photovoltaic (PV) panel-water sorption layer system that has a water sorption layer formed directly on a back face of a PV panel;
generating electrical energy from solar energy received at a front face of the PV panel, wherein the front face is opposite to the back face;
transferring heat generated by the PV panel to the water sorption layer to evaporate water stored by the water sorption layer, which results in cooling down the PV panel;
opening a cover lid with an actuation device, wherein the cover lid together with the back face of the PV panel form a sealed chamber in which the water sorption layer is located; and
allowing moist air to enter the chamber to replenish the water in the water sorption layer.

16. The method of claim 15, further comprising:
closing the cover lid to seal the chamber and to restart the water evaporation process.

17. The method of claim 16, further comprising:
actuating an actuation device to close or open the cover lid.

* * * * *